United States Patent [19]

Mori et al.

[11] 4,380,061
[45] Apr. 12, 1983

[54] LOOP TRANSMISSION SYSTEM WITH IMPROVED BYPASS ROUTING ARRANGEMENT

[75] Inventors: Kinji Mori, Sagamihara; Hirokazu Ihara, Machida; Hiroshi Matsumaru, Katsuta, all of Japan

[73] Assignee: Hitachi, Ltd., Tokyo, Japan

[21] Appl. No.: 281,782

[22] Filed: Jul. 9, 1981

[30] Foreign Application Priority Data

Jul. 11, 1980 [JP] Japan ................... 55-93924

[51] Int. Cl.³ .......................... H04Q 9/00; H04J 3/14
[52] U.S. Cl. ........................................ 370/16; 370/88
[58] Field of Search ............................ 370/16, 86, 88; 340/825.01, 825.05; 179/18 EA; 371/8, 11

[56] References Cited

U.S. PATENT DOCUMENTS

Re. 28,958  9/1976  Zafiropulo et al. ................... 370/87
3,519,750  7/1970  Beresin et al. .......................... 370/16
4,190,821  2/1980  Woodward ............................. 370/16

*Primary Examiner*—Thomas A. Robinson
*Attorney, Agent, or Firm*—Antonelli, Terry & Wands

[57] ABSTRACT

A double loop transmission system is provided in which not only bypass routes but also terminals are connected with a pair of transmission control units of each loop. In this manner, the transfer of a message is controlled by both the information concerning whether the smaller loop formed by a pair of the adjacent transmission control units is abnormal or not and the bypass code data contained in the message. The transmission can thus be continued no matter which loop has its transmission control units disordered. And the transmission between the terminals can be performed by the construction and reconstruction of the bypass routes when a loop which has been disordered is restored.

12 Claims, 10 Drawing Figures

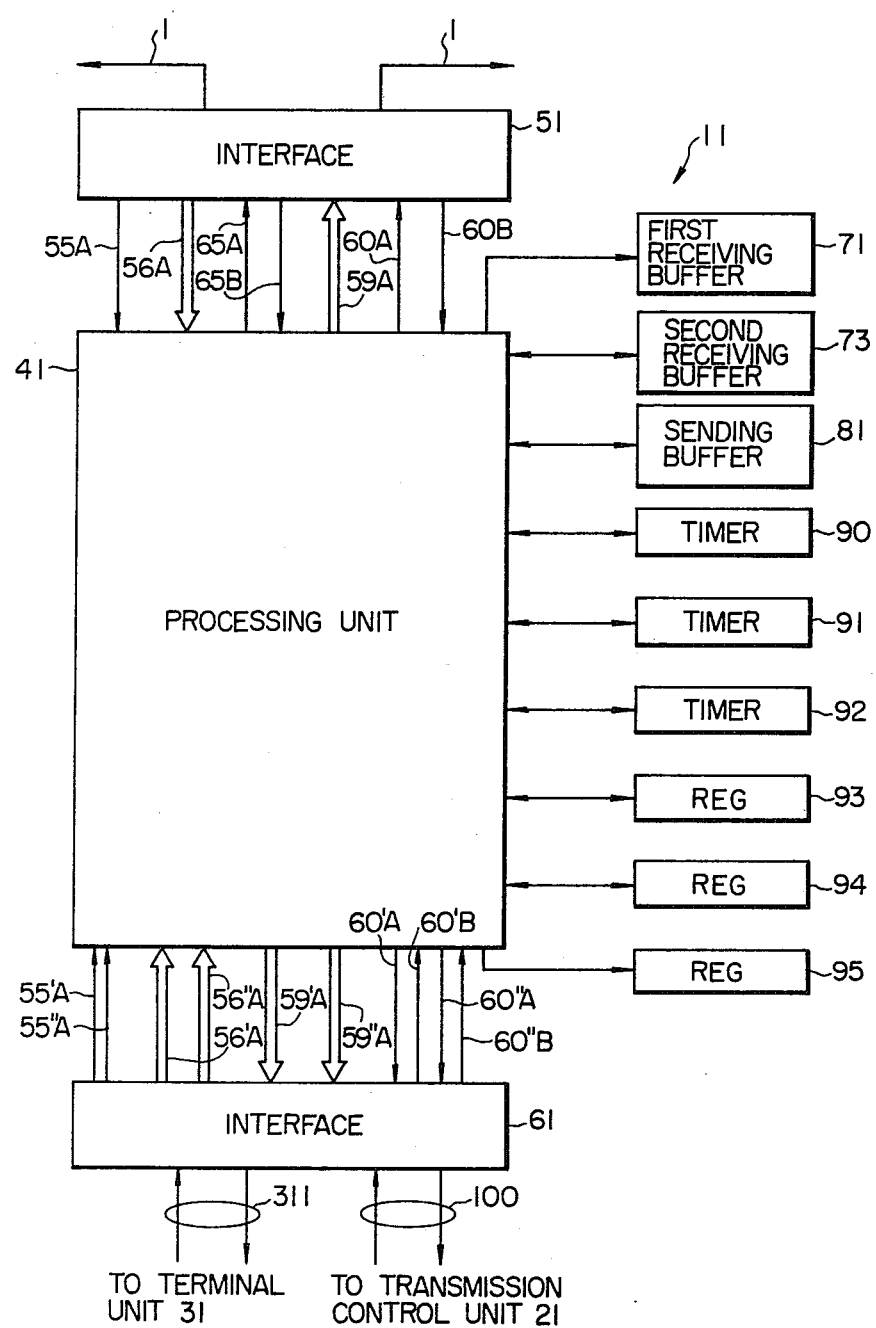

LOOP TRANSMISSION SYSTEM WITH IMPROVED BYPASS ROUTING ARRANGEMENT

BACKGROUND OF THE INVENTION

The present invention relates generally to a loop transmission system having double loops, and, more particularly, to a loop transmission system which can effectively bypass disordered elements to continue transmission.

A single loop transmission system cannot be used as a whole if even a partial malfunction exists in its loop. Therefore, such single loop systems are low in reliability. In order to enhance the reliability of the transmission system, according to the prior art, the loop-shaped transmission route is doubled, and transmission control units are arranged in the doubled respective transmission routes. The data transmission between terminal units is performed through such transmission control units. When the transmission system as a whole is normal, both the loops are used independently of each other so that the transmission is performed between the terminal units. Further, methods have also been developed to bypass a disordered portion of the transmission route when the transmission system is partially disordered. According to the method thus proposed according to the prior art, however, if one of the loops is abnormal while the other is normal, some of the transmission control units which remain normal may also become incapable of performing the data transmission.

SUMMARY OF THE INVENTION

It is, therefore, an object of the present invention to provide a loop transmission system which can improve the transmission of a message by providing a bypass code in the message to be transmitted so that the message transmission may be controlled by the use of that bypass code.

For this and other objects, therefore, in a double loop transmission system, not only the bypass routes but also terminals are connected with a pair of transmission control units of each loop. This permits the transfer of a message to be controlled both by information concerning whether the smaller loop formed by a pair of adjacent transmission control units is abnormal or not and by bypass code data contained in the message itself. As a result, the transmission can be continued no matter which loop has its transmission control units disordered. And the transmission between the terminals can be performed by the construction and reconstruction of the bypass routes when a loop which has been disordered is restored.

BRIEF DESCRIPTION OF THE DRAWINGS

FIG. 2 is a more detailed block diagram showing a transmission control unit to be used in the system of FIG. 1;

DESCRIPTION OF THE PREFERRED EMBODIMENT

The present invention will now be described in conjunction with the embodiment thereof.

Figure 1:
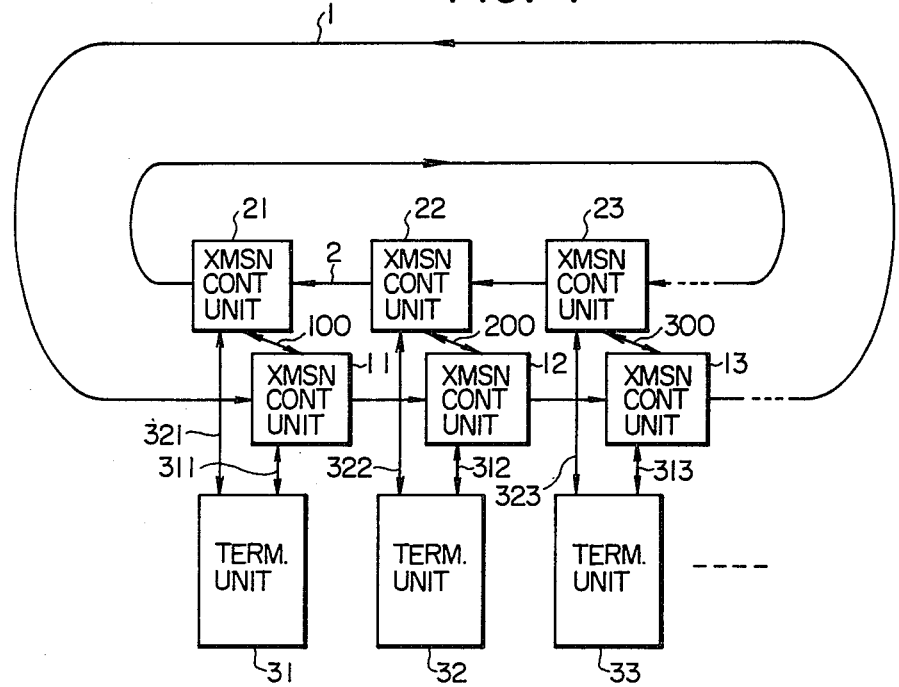
FIG. 1 is a schematic block diagram showing a loop transmission system according to the present invention.

A loop transmission system shown in FIG. 1 is composed of a major loop 1 for transmitting a message in a counterclockwise direction and a major loop 2 for transmitting a message in a clockwise direction. Transmission control units 11, 12 and 13 are connected with the major loop 1, whereas transmission control units 21, 22 and 23 forming pairs with those units 11, 12 and 13, respectively, are connected with the major loop 2. The paired respective units 11 and 21, 12 and 22, and 13 and 23 are connected on one hand with each other through bypass routes 100, 200 and 300, each of which can effect two-way transmission of the message, and on the other hand with terminal units 31, 32 and 33, respectively, through lines 311 to 313 and 321 to 323, each of which can effect two-way transmission of the data. The message contains either the date from the respective terminal units or a command for the communication control units. When the units 11, 12, 13, 21, 22 and 23, and the major loops 1 and 2 are operating normally, the major loop transmission system which is composed of units 11 to 13 and the major loop 1, and the major loop transmission system which is composed of units 21 to 23 and the major loop 2, perform the message communications without any interference from each other. If any of the units 11 to 13 and 21 to 23 in the major loops 1 and 2 develop a problem, the units 11 to 13 and 21 to 23, the bypass routes 100, 200 and 300, and the major loops 1 and 2 are used in accordance with the malfunctioning portion to form a single closed loop type composite transmission system so that they are mutually interconnected. For example, in case the transmission system of the major loop 1 is operating abnormally, whereas the transmission system of the major loop 2 is operating normally, the terminals 11 to 13 communicate partly through the transmission system of the major loop 2 and partly through the composite transmission system which is formed by suitably combining the major loops 1 and 2, the bypass routes 100 to 300, and the units 11 to 13 and 21 to 23.

Thus, the transmission control units 11, 12 and 13, or 21, 22 and 23 are so constructed to perform a first function, during normal operation, of sending a message to the major loop 1 or 2 corresponding thereto and receiving the message from the major loop 1 or 2, and a second function, when the transmission system of the major loop 1 or 2 is operating abnormally, to send and receive the messages to and from the bypass routes 100, 200 and 300, respectively.

FIG. 2 shows the circuit block diagram of the transmission control unit 11 of FIG. 1. The remaining transmission control units have the same construction as that shown in FIG. 2. As can be seen, the unit 11 is composed of: an interface 51 for sending and receiving a message to and from the major loop 1; an interface 61 for sending and receiving a message to and from the bypass route 100; first and second receiving buffers 71 and 73 for storing the messages which have been received through those interfaces 51 and 61, respectively; a sending buffer 81 for storing the messages to be sent through those interfaces 51 and 61; a processing unit 41 for controlling the sending and receiving operations of those messages; timers 90 to 92; and registers 93 to 95. The portion of the transmission control unit 11 other than the interfaces 51 and 61 can be realized by means of a microcomputer.

Figure 3:
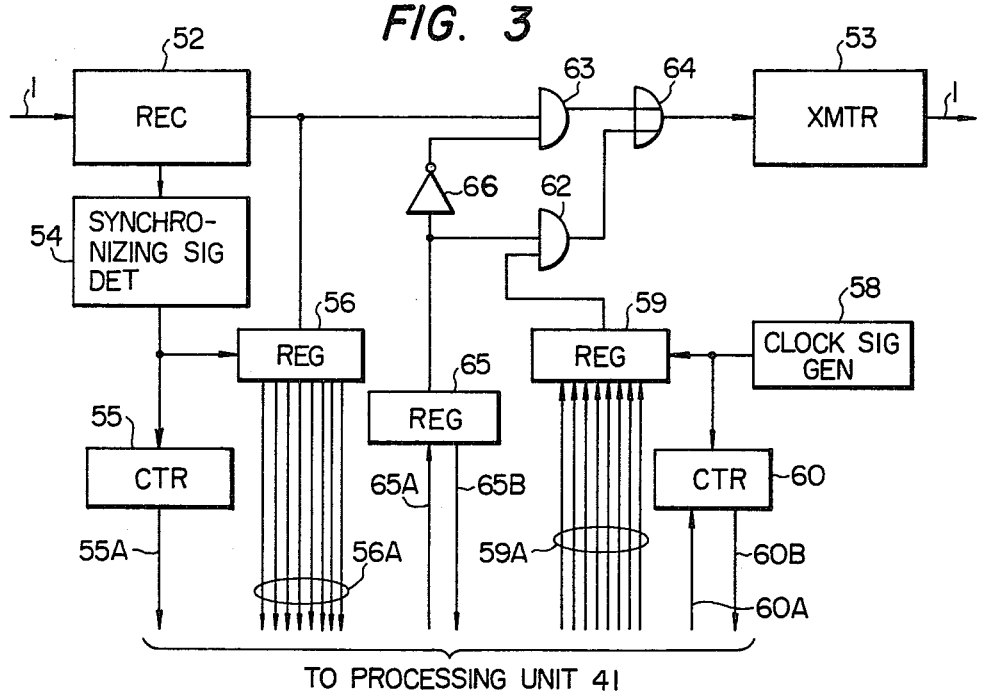
FIGS. 3 and 4 are more detailed block diagrams showing interfaces 51 and 61.
Figure 4:
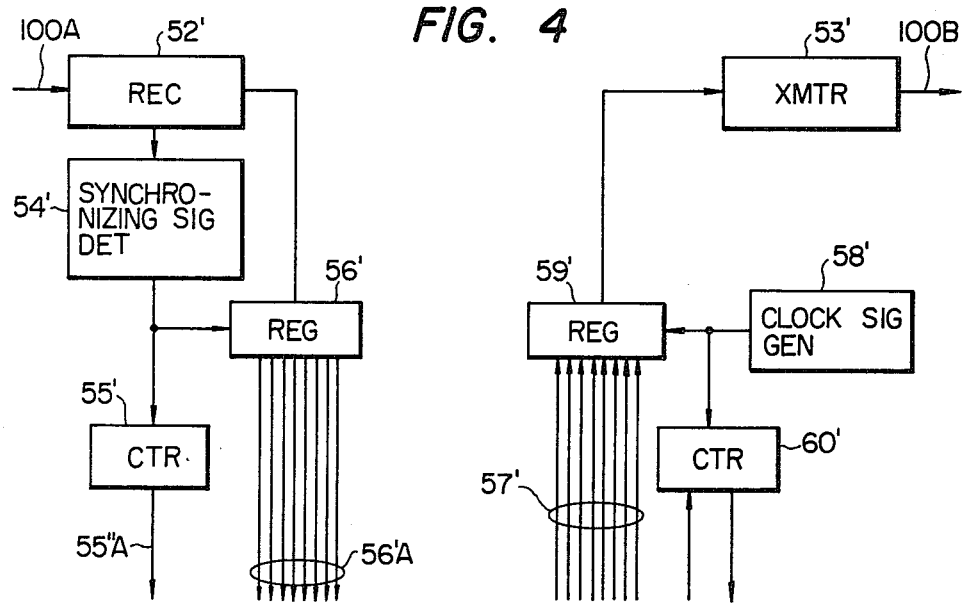

FIG. 3 is a detailed block diagram showing the interface 51, while FIG. 4 shows the portion of the interface 61 which is connected with the bypass route 100. The construction of the portion of the interface 61 which is connected with the line 311 is the same as that of FIG. 4 and is not shown. Those portions, which are shown in FIG. 4 using the reference numerals of FIG. 3 with primes (') indicate that the elements referred to are the same as those of FIG. 3. The circuit shown in FIG. 4 is different from that of FIG. 3 only in that it does not have the gates 62 to 64 and 66 and the register 65 of FIG. 3. Because of the similarity of FIGS. 3 and 4, a repeated detailed description is omitted for FIG. 4 with regard to the identical elements. The portion of the interface 61 which is connected with the line 311, will hereinafter be referred to with double primes (") for the reference numbers which correspond to identically numbered portions of FIG. 3.

Figure 5:
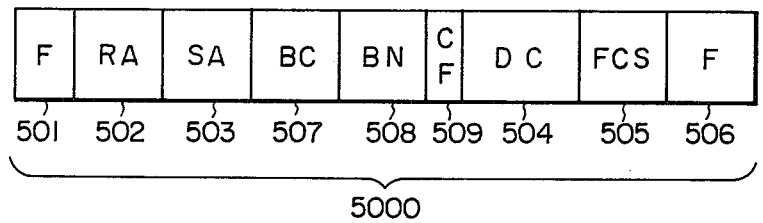
FIG. 5 is a view showing the format of a message to be transmitted.

The shape of the message format in accordance with the present invention is shown in FIG. 5. As shown, the message 5000 is composed of: a region 501 of a flag (F) indicating the starting portion of the message; a region 502 of a receiving address (RA) for specifying the transmission control unit which is to receive the message; a region 503 of a sending address (SA) indicating the transmission control unit which is sending the message; a region 504 of data or a command (DC) to be transmitted; a region 505 of error detecting data (FCS) of the message; a region 506 of a flag (F) indicating the end portion of the message; a region 507 of a bypass code (BC) indicating the condition of the bypass; a region 508 indicating the number of bypasses (BN); and a region 509 of a command flag (CF) for indicating whether or not the command is contained in place of the data in the data region 504.

The addresses of the transmission control units 11 to 13 and 21 to 23 are composed of loop number portions corresponding thereto and the number portions in the loops. On the other hand, the addresses of the paired transmission control units connected with an identical terminal unit are so predetermined that only the loop number portions are different. The loop number portions are numbered at "0" and "1", respectively, for the loops 1 and 2.

Figure 6A:
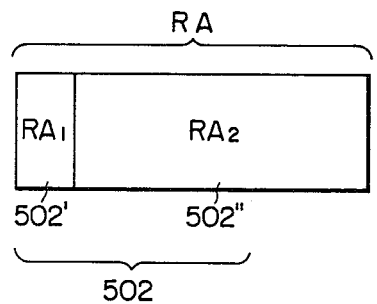
FIGS. 6(a) and (b) are views showing the data formats of receive and send address regions, respectively.
Figure 6B:
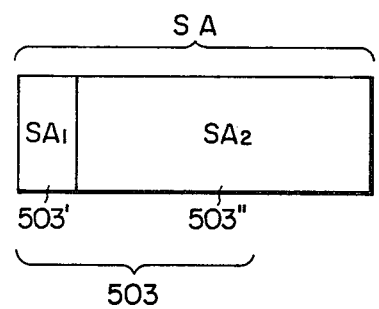

As a result, as shown in FIG. 6, the region 502 of the receiving address (RA) is composed of a portion 502' of a loop number (RA$_1$) and a portion 502" of a number in a loop (RA$_2$). Likewise, the region 502 of the sending address (SA) is composed of a portion 503' of a loop number (SA$_1$) and a portion 503" of a number in a loop (SA$_2$). Incidentally, the bypass code BC and the bypass number BN are used to form the composite transmission system, which is composed of the major loop 1, the major loop 2 and the plural bypass routes, so that when the transmission system of the loop 1 or 2 becomes abnormal, by such a method as will be described hereinafter, the message will be prevented from perpetually circulating in the composite transmission system, respectively.

Each of the transmission control units sets both the bypass code BC and the bypass number BN of the message at 0 when it feeds out a message as a transmission source. On the other hand, each of the transmission control units is so constructed to perform different operating modes on the basis of the bypass code BC, the bypass number BN and address information RA and SA in the message, and on the basis of the address of its own in case it receives that message, as follows:

(1) If the in-loop number RA$_2$ in the receiving address RA is equal to the in-loop number of the transmission control unit and if BC=0 and CF=0 hold, the transmission control unit feeds out that message to the terminal unit connected thereto and transfers that message. For CF=1, the transmission control unit performs the operation which is instructed by the command in that message.

(2) If the loop number SA$_1$ and the in-loop number SA$_2$ in the sending address SA are equal to the loop number and the in-loop number of the transmission control unit itself, this unit cancels the message regardless of whether BC=0 or 1.

(3) If the in-loop number SA$_2$ in the sending address SA is equal to the in-loop number of the transmission control unit, but the loop number SA$_1$ is not, and if BC=0 and CF=0 hold, the transmission control unit feeds out the message through the bypass route to the transmission control unit mating therewith. For CF=1, moreover, the transmission control unit performs the operation which is instructed by the command in the message.

(4) If the in-loop number SA$_2$ in the sending address SA is equal to the in-loop number of the transmission control unit, and if BC=1 holds, the transmission control unit corrects the BC to 0 and transfers the message.

(5) In cases other than the aforementioned items (1) to (4), the transmission control unit exclusively transfers the message received as it is.

(6) When the message of CF=0 received from the first or second loop is to be transferred, the transmission control unit corrects, if a later-described minor loop to which it belongs is abnormal, the bypass code BC of the message received from 0 to 1 and adds 1 to the bypass number BN of the received message until it transfers that message to the corresponding bypass route. Nevertheless, if CF=0 holds in the case of the item (3), the transmission control unit transfers that message to the corresponding bypass route even if that minor loop is normal.

(7) When the message received from the bypass route is to be transferred, the transmission control unit transfers that message to the first or second major loop.

(8) If, in the case of the item (5), the bypass number BN of the message received exceeds a predetermined number, e.g., 2, the transmission control unit cancels that particular message.

The particular operations of the units 11 to 13 in carrying out the above operation modes when the data is transferred from the terminal unit 31 to the terminal unit 33 will now be described in the following with reference to FIGS. 2 to 5.

In the unit 11, the registers 93 to 95 are set at "0", as will be described hereinafter, when the transmission system of that major loop 1 is not operating abnormally. At this time, the unit 11 sends the data from the terminal unit 31 to another terminal unit, e.g, the terminal unit 33, in the following manner.

First of all, the data DC to be sent is received together with the sending address SA of the data from the terminal unit 31 through the interface 61 by the processing unit 41 of the unit 11. The data is then converted under the control of the processing unit 41 into a message having such a shape as is shown in FIG. 5 until it is stored in the sending buffer 81. The bypass code BC and the bypass number BN of the message thus newly produced are "0". While the major loop 1 is operating normally, the bypass code BC and the number BN are left at "0" during the transmission of the message. The command flag CF is also set at "0".

This message is then stored in sending buffer 81 together with the data indicating the sent number of the message from the unit 11. The message, which is produced on the basis of the data DC fed from the terminal unit 31 but which is not sent yet, as in the above, has its sent number of "0".

The processing unit 41 seeks, at a predetermined time, to determine whether or not there is a message to be set in the first and second receiving buffers 71 and 73 and in the sending buffer 81. If, in this case, it is detected that there is the message to be sent in the sending buffer 81, the processing unit 41 sets the register 65 of the interface 51 at "1" through a line 65A thereby to indicate that the sending operation is in process and feeds a register 59 in the interface 51 with the leading eight bits of the message to be sent through a line 59A while resetting the counter 60 through a line 60A.

The data comprised of the eight bits in the register 59 is serially fed out in response to the clock of a clock signal generator (CLK) 58. The AND gate 62 is then in its opened state because the output of the register 65 is "1". As a result, the output of the register 59 is fed through the AND gate 62 and the OR gate 64 to a transmitter 53 from which it is fed out to the major loop 1. At this time, the other input to the OR gate 64 is "0". This is because the AND gate 63 is held under its closed state by the output "0" of the inverter 66. The counter 60 is a counter of three bits for counting the output of the CLK 58 so that it feeds out an overflow signal to a line 60B when it counts the clock signals corresponding to the eight bits. The processing unit 41 responds to that overflow signal thereby to feed out the subsequent eight bits of the message in the sending buffer 81 to be sent to the register 59. The operations thus far described are repeated so that the message of a predetermined length can be fed out to the major loop 1. When the sending operation of the message in the sending buffer 81 to be sent is completed, the sending number data of that message is set at "1", and the register 65 is set at "0". On the other hand, the processing unit 41 sets the timer 90. The set time of this timer 90 is set at a value which is slightly larger than the time which is required for the message to circulate once through the major loop 1.

When the message fed out of unit 11 arrives at the receiver 52 of the unit 12, a synchronizing signal detector 54 detects the bit sequence of the message received thereby to generate a synchronizing signal which is in synchronism with each of the bit sequence. The data received by the receiver 52 is stored in a register 56 of eight bits in synchronism with that synchronizing signal. A counter 55 is a counter of three bits which generates an overflow signal on a line 55A when it counts eight synchronizing signals. The processing unit 41 in the unit 12 takes in the eight bits of the register 56 through a line 56A in response to that overflow signal and stores them in the first receiving buffer 71. Subsequently, the same processes are repeated so that the message fed out of the major loop 1 is stored every eight bits in the first receiving buffer 71.

If the unit is not sending the message upon reception of that message, the register 65 is stored with "0". As a result, since the AND gate 63 is in its opened state, the respective bits of the message received are stored in the first receiving buffer and are fed, as they are, to the transmitter 53 through the AND gate 63 and the OR gate 64 until they are transferred again to the major loop 1.

The processing unit 41 judges, when it receives the receiving address RA, the sending address SA, the bypass code BC and the bypass number BN, which of the aforementioned operating modes (1) to (8) is to be performed on the basis of those data. It is limited to the cases of the operating modes (1), (2) and (5) that can take place when both the major loops 1 and 2 are operating normally. More specifically, when the processing unit 41 judges that the operating mode (1) or (5) is to be taken, the taking-in operation of the message is continued. Since the message thus received has already been transferred to the major loop 1, the processing unit 41 need not transfer the message to the major loop any more. In order to indicate the lack of necessity of that transfer, the content "0" of the register 65 is taken in from a line 65B and is stored as the data accompanying the received message in the first receiving buffer. On the contrary, when the processing unit 41 judges that the operating mode (2) should be taken, it instantly sets the register 65 at "1" through the line 65A and interrupts the transfer of the remainder of the message from the receiver 52 to the transmitter 53 until it stores that remainder in the first receiving buffer 71. After having been informed of the fact that an entire message had already been received as a result of the decoding process of the flag region 506 (as shown in FIG. 5) in the message, the processing unit 41 again sets the register 65 at "0" thereby to indicate that the message should not be cancelled.

If the unit 12 is in the process of its message sending process, the register 65 is set at "1". As a result, the message received by the receiver 52 is not set to the transmitter 53 but is stored in the first receiving buffer 71 so that which operating mode should be taken is judged similarly to the aforementioned case in which the unit 12 is in its sending process.

If, as in the example just described, the sending address SA of the message received is not its own one but the operating mode (5) is taken, that message has to be transferred again to the loop 1. In order to indicate this necessity, the content "1" of the register 65 is stored in the first receiving buffer 71.

The unit 12 having received the message again sends the message to the loop 1 at its predetermined sending time, on condition that the bit accompanying that message and indicating the necessity and unnecessity for the sending process is "1", and erases the message from the first receiving buffer 71. If that bit is "0", that message is erased rather than sent. The message fed out to that loop 1 is stored in the first receiving buffer 71 of the terminal unit 13, when it reaches the interface 51 of the unit 13, in a similar manner to the foregoing description of the unit 12. In this manner, which operating mode should be taken by the unit 13 is judged by the proing unit 41 therein on the basis of its receiving address RA, sending address SA, bypass code BC and bypass number BN. If, as in this example, the in-loop number $RA_2$ in the receiving address RA is equal to that of the unit 13, and if BC=0 holds, the operating mode (1) is carried out. More specifically, the processing unit 41 feeds out the data DC in the message in the first receiving buffer 71 to the terminal unit 33 through the interface 61 at its determined sending time. Moreover, the message in that first receiving buffer 71 is fed out to the major loop 1 through the interface 51. In these ways, the data is sent from the terminal unit 31 to the terminal unit 33, and the message fed out of the unit 13 to the major loop 1 is transmitted through the major loop 1 unit it reaches the unit 11. This unit 11 receives that message through the interface 51 and stores the same in the first receiving buffer 71. In the unit 11, since it is detected that the sending address SA in the message in that receiving buffer 71 designates unit 11 itself, and since BC=0 holds, both the message in that first receiving buffer and the original message in the sending buffer 81 are erased and are not transferred to the major loop 1. The processing unit 41 then resets the timer 90.

The operations thus far described are those of the transmission control units 11 to 23 in cases where the transmission system of the major loop 1 is operating normally. The operations of the transmission control units 21 to 23 in cases where the transmission system of the other major loop 2 is operating normally are identical. Upon transfer of some data DC, one of the transmission systems of the loops 1 and 2 is selected by the terminal unit which sends the data DC. Thus, the terminal units 31 to 33 interchange their data through both the loop transmission systems 1 and 2.

When a message is not returned for any reason to the unit 11 having sent that message, the timer 90 produces a time-up signal indicating that the period set for the timer 90 has expired. In response to this time-up signal of the timer 90, the processing unit 41 sends again the message which had previously been sent and which has been stored in the sending buffer 81, to the loop 1. Upon each of these resending processing, the data of the sending number in the sending buffer 81, which accompany that message, are counted up. These resending processes are repeated a predetermined number of times so long as the message sent by the unit 11 during a predetermined one circulation time period are not received by the unit 11.

Figure 7:
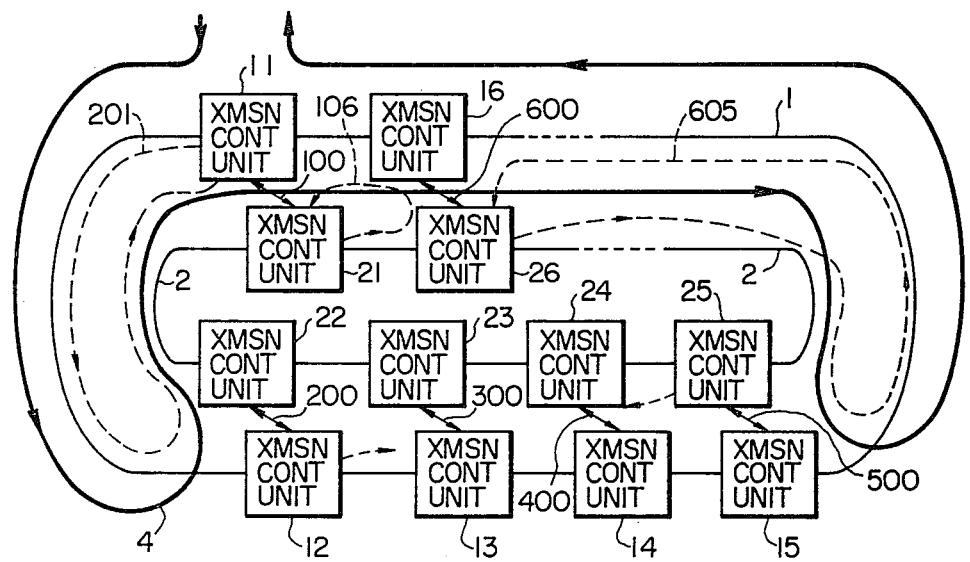
FIG. 7 is a view for explaining the bypass route forming process upon the occurrence of a first mode problem in the system of FIG. 1.

If the unit 11 repeatedly sends the same message a predetermined number of times, and the message circulates once through the major loop 1 but is not returned to the unit 11, the sending time data in the sending buffer 81 will exceed a predetermined value. In this situation, the processing unit 41 judges that the loop is operating abnormally. The processing unit 41 then starts its process for establishing a bypass route. This process will be described with reference to FIG. 7. In FIG. 7, the same reference numerals as those of FIG. 1 indicate identical parts.

In the system shown in FIG. 7, there is added to the system of FIG. 1 transmission control units 14, 15 and 16, and 24, 25 and 26, and bypass routes 400, 500 and 600 for purposes of giving a fuller explanation of the bypass operation. These added units have the same construction as the unit 11 of FIG. 1. In FIG. 7, however, the terminal units, which are connected with the transmission control units 11 and 21, 12 and 22, 13 and 23, 14 and 24, 15 and 25, and 16 and 26, respectively, are omitted for simplicity of illustration.

The unit 11, having detected a malfunction in the loop transmission system, sets the value "1" in the register 93. This indicates that the processing unit 41 has been required to check the minor loop, and sends to the major loop 1 a first message which contains: the command flag of CF=1; a minor loop check command arranged in the sending data region 504; the receiving address RA indicating the adjacent transmission control unit 12 in the major loop 1; and the sending address SA composed of the address of the unit 11 itself. At the same time, the unit 11 feeds out to the bypass route 100 a second message which contains: the receiving address RA designating the unit 21; the check command arranged in the sending data region 504; and the sending address SA having the address of the unit 11 itself. Moreover, the unit 11 sets the timer 91. The setting time of this timer 91 is made slightly longer than the time period which is required for the message to circulate once in a minor loop 201 including the units 11, 12, 22 and 21. The bypass number BN and the bypass code BC of the message containing that minor loop check command are "0". The transmission control unit having received the message containing that minor loop check command changes neither the bypass code BC nor the bypass number BN.

In the unit 12 designated by the first message, this first message is stored in the first receiving buffer 71 so that the processing unit 41 detects that the bypass code BC=0 and that the in-loop number $RA_2$ in the receiving address RA is equal to the in-loop number thereof thereby to perform the operating mode (1). In other words, the processing unit 41 decodes the command and the sending address SA in the first message. As a result of this decoding process, having determined that the command is the minor loop check command and that the sending address SA does not belong to unit 12 itself, the processing unit 41 in the unit 12 does not transfer that message to the major loop 1 but feeds out to the bypass route 200 a message which is composed of: the receiving address RA for designating its mating unit 22; the command sent; and the sending address SA.

In the unit 22, after having detected that the signal is fed from the route 200 to the interface 61, the processing unit 41 responds to the detected result to take the message on the route 200 into the second receiving buffer 73. Then, the processing unit 41 detects that the in-loop number $RA_2$ in the receiving address RA in the message thus taken in is equal to the in-loop of itself, that BC=0 holds, that the command in that message is the minor loop check command, and that the sending address SA does not belong to unit 22 itself. Based on this, the processing unit 41 in unit 22 feeds out to the major loop 2 a message after the receiving address RA of that message has been converted into the address designated by the unit 21.

When the message from unit 22 passes through the major loop 2 and arrives at the unit 21, this unit 21 stores that message in the first receiving buffer 71 through the interface 51. The processing unit 41 in the unit 21 detects that the in-loop number $RA_2$ in the receiving address RA in that message is equal to its own in-loop number, that BC=0 holds, that the command in that message is the minor loop check command, and that the sending address SA does not belong to unit 21 itself. In accordance with this, processing unit 41 in unit 21 feeds out that message through the interface 61 to the bypass route 100. The unit 11 takes the message into the first receiving buffer 71, when it detects that the message is fed through the route 100, and detects that the in-loop number $RA_2$ in the receiving address RA in that message is equal to its own one and that BC=0 holds. Unit 11 also decodes the command and the sending address SA in the message and thereby determines that the minor loop 201 between the units 12, 22, 21 and 11 is normal in view of the fact that the sending address SA belongs to unit 11 itself. In this case, it is known that further transferring of the message is unneccessary. After that, the unit 11 resets the timer 91 and sets the register 94 at "1" thereby to indicate that the minor loop has been checked. The register 95 has its content left at the bit "0" in order to indicate that the major loop 1 can still be used.

On the other hand, when the unit 21 receives the second message which has been fed out of the unit 11 to the route 100, its processing unit 41 stores the second message in the second receiving buffer 73 and then decodes the command and the sending address SA in that message if it detects that the in-loop number $RA_2$ in the receiving address RA in that message is equal to its own one and that BC=0 holds. As a result of these decoding processes, the processing unit 41 in unit 21 determines that the code is the one required for the minor loop to be checked. If it is also determined that the message has been sent from unit 11 on loop 1 rather than loop 2, said unit 11 having the unit 21 connected therewith as mates with the unit 21 (namely, that the in-loop number $SA_2$ in the sending address SA is equal to the in-loop number of itself and that the loop number $SA_1$ is different from the loop number of itself), the processing unit 41 sets the register 93 at "1" in order to indicate that a minor loop is to be checked. The processing unit 41 then feeds out to the loop 2 a message which contains the sending address SA indicating itself, the receiving address RA indicating the unit 26, and the minor loop check command. Moreover, the processing unit 41 sets the timer 91. The set time of that timer is set at a slightly longer time period than that required for the message to circulate once through the minor loop 106 joining the units 21, 26, 16 and 11.

In the units 26, 16 and 11, the same processes as those having been described in connection with the units 12, 22 and 21 are performed, and, if a minor loop 106 is normal, the unit 21 is fed from the bypass route 100 with the message which uses the address of that unit as the receiving address and the sending address and which contains the minor loop check command. As a result, the unit 21 decodes that message so that it leaves the register 95 at "0" in order to indicate that the minor loop 106 is normal and that it is unnecessary to use the bypass route 100. The unit 21 then sets the register 94 at "1" and resets the timer 91 so as to indicate that the minor loop has already been checked.

Thus, the checking processes of the minor loops 201 and 106 are finished.

As to the checking process of the minor loop 106, the unit 21, which belongs to the same loop as unit 26 of the group of units 26, 16 and 11 participating in the transfer of the message which has fed out the minor loop check command, sets its register 93 at "1", when it receives the message containing the minor loop check command, in order to indicate this command.

As to the checking process of the minor loop 201, the unit 12, which belongs to the same loop as such a unit of the units 12, 22 and 21 participating in the transfer of the message which has fed out the message containing the minor loop check command, sets the register 93 therein at "1".

As a result of the processes thus far described, the units 12 and 26 have their register 93 set at "1" but their register 94 not set at "1". The units thus having their register 93 set at "1" and their register 94 not set at "1" act as sending sources by themselves to send the message containing the minor loop check command.

For example, the unit 26 checks a minor loop 605, which joins the units 26, 25, 15 and 16, absolutely in the same manner as that of the unit 21 and sets the register 94 at "1", while leaving the register 95 at "0", once it is determined from the checking process that the transmission can be performed.

The unit 12 also checks the minor loop, which joins the units 12, 13, 23 and 22, absolutely in the same manner as that of the units 21 and 26. If, in this case, the unit 13 has a problem, the message fed out of the unit 12 and containing the minor loop check command does not return to the unit 12 at the end of the time period set for the timer 91. At this time, the unit 12 transmits the message for the aforementioned minor loop check repeatedly a predetermined number of times. Nevertheless, if the unit 12 fails to detect that the loop can effect the transmission, it sets the register 94 at "1" thereby to indicate that the minor loop check has been finished and sets the register 95 at "1" thereby to indicate that the minor loop is abnormal and that the bypass route 200 should be used. At this time, the register 65 is also set at "1" so that the message received is inhibited from being further transferred to the major loop 1.

Moreover, the transmission control unit 25 having received the message containing the minor loop check command from the unit 26 similarly performs the minor loop check by itself, too. In the example of FIG. 7, the unit 25 sets both the registers 95 and 65 at "1" in order to indicate that the bypass route 500 should be used because the unit 24 is abnormal. In these ways, each of the transmission control units judges in view of the register 95 whether or not the bypass route should be used. For example, in FIG. 7, the units 12 and 25 know that they should use their respective bypass routes.

Incidentally, the transmission control units, which have received the requirements for the minor loop checks and have transmitted the minor loop check commands, while acting as the transmission sources by themselves, in the operations thus far described, set the timer 92 at their transmitting times. The set timer of this timer 92 is set slightly longer than the time period which is required for the minor loop check command to circulate once through the normal loop 1 or 2. Each of the transmission control units does not send the message containing the minor loop check command, while acting as a transmitter by itself, when it receives the message, which comes from the adjacent transmission control unit on the same loop and which contains the minor loop check command, before that timer is finished with its time period. Thus, in case the loop 1 is restored to its normal state after having become temporarily abnormal, the minor loop checking process is prevented from being perpetually repeated.

Thus, the checking process as to whether the bypass route should be used or not is finished by using the message containing the minor loop check command. Under the condition in which the check of the minor loop has been finished in that way, the operation of the system in case a message containing the usual data (CF=0) is to be transmitted from the unit 11 to the unit 15 will now be described. When such a message arrives at the unit 12, the processing unit 41 in the unit 12 takes that message into the first receiving buffer 71 and judges from the addresses RA and SA, the bypass number BN and the bypass code BC of that message whether this message should be further transferred or not. In the present example, the processing unit 41 in the unit 12 judges that the message should be further transferred and then inverts the value of the bypass code BC in the message from "0" to "1" until it transfers the message to the bypass route 200 after the value of the bypass number BN is counted up from "0" to "1".

On the contrary, the unit 22 stores in the second receiving buffer 73 the message which is fed from the bypass route 200, and transfers that message to the major loop 2 when it judges, as in the present example, that the message should be further transferred. The content of this second receiving buffer 73 is erased later. The unit 21 performs the operating mode (4) if it knows that the in-loop number $SA_2$ in the sending address SA in the message is coincident with its own one and that BC=1 holds when it receives that message. In other words, the unit 21 transfers the message received to the major loop 2 after it has inverted the BC from "1" to "0". After that, the message is transferred through the unit 26 to the unit 25. This unit 25 performs the operating mode (1) if it is informed of the fact that the in-loop number $RA_2$ in the receiving address RA of that message is equal to its own one and that BC=0 and CF=0 hold. In other words, the unit 25 feeds out the message to the corresponding terminal unit (not shown in FIG. 7, but which would be coupled to unit 25 in the manner shown in FIG. 1) and then transfers the message to the bypass route 500. At this time, the unit 25 increases the bypass code BC from "0" to "1" and the bypass number BN from "1" to "2".

The unit 15 discriminates the operating mode to be performed as to the message it receives on the bypass route 500. In the present case, even though the in-loop number $RA_2$ in the receiving address RA of that message is coincident with its own one, since BC=1 holds the message is merely sent to the major loop 1. This message is thus sent to the unit 11 rapidly. Since both the loop numbers $SA_1$ and $SA_2$ in the sending address SA of that message are coincident with its own one, the unit 11 judges that the sending process of that message has been finished and then cancels the message (in the operating mode (2)). As a result, the message, which has been generated by the unit 11, is transferred through the bypass route 200 and the unit 22 to the major loop 2 and is further transmitted by the unit 25 again through the bypass route 500 and the unit 15 to the major loop 1 until it is returned to the unit 11. Thus, there is formed one closed composite transmission system which is indicated at a thick line 4 and which is constructed of the loops 1 and 2 and the bypass routes 200 and 500.

On the other hand, the transmission control units 12 and 25, which operate so as to set the register 95 at "1" and to subsequently use the corresponding bypass routes 200 and 500 for sending the message, periodically feed out to the corresponding major loops 1 and 2 the message containing the major loop check command. At the same time these units set their respective timers 90. The receiving address RA and the sending address SA of that message use the addresses of the units themselves. The other transmission control units on the major loop 1, which have received the message containing that major loop check command from the unit 12, again feed out that message to the corresponding major loop 1 irrespective of whether their registers 95 are set at "1" or not. As a result, when all the transmission control units on the major loop 1 are normal, the message is returned to the transmission control unit 12 which has transmitted the same. If this occurs, the transmission control unit 12 sets the registers 93 to 95 at "0" and sends the message to the corresponding major loop 1 without using the bypass route 200 for the message sending operation.

On the other hand, when any of the transmission control units on the loop 1 still have problems, the time set by timer 90 expires before the message containing that major loop check command is returned to the transmission control unit 12 having sent that message. When this time expires in this manner, the transmission control unit 12 judges that the corresponding major loop 1 is abnormal and leaves the registers 93 to 95 as they are. At this time, the transmission control unit 12 periodically feeds out to the unit 13 the message containing the minor loop check command thereby to check the minor loop which is composed of the units 12, 13, 23 and 22. The unit 12 sets the register 95 at "0", when it detects that those minor loops are normal, and subseequently uses the major loop 1 for sending the message without using the bypass route 200 for sending the message.

Both the operations of the transmission control units on the major loop 2, which have received the message sent from the unit 25 and containing the major loop check command, and the subsequent operations of the unit 25 are the same as those relating to the unit 12.

In the ways thus far described, the transmission routes after formation of the composite transmission system are checked.

In FIG. 7, if the units 13 and 24 are restored from their problems, and if these restorations are detected by those checks, the respective transmission control units 11 to 16 and 21 to 26 perform those operations in the manner above when the transmission routes are normal (which have been described with reference to FIG. 1). On the other hand, in a case where the restorations of the units 13 and 24 from their problems are not detected, the respective transmission control units perform those operations, when the transmission routes are abnormal, which have been described with reference to FIG. 7. However, if, for example, only the restoration of the unit 24 from its problems is detected by that check while unit 13 continues to have problems, the operations of the respective transmission control units are performed in the manner described hereinafter. By way of example then, it is assumed that only the restoration of the unit 24 from its problems is performed, and the system operation in this case will now be described with reference to FIG. 8.

Figure 8:
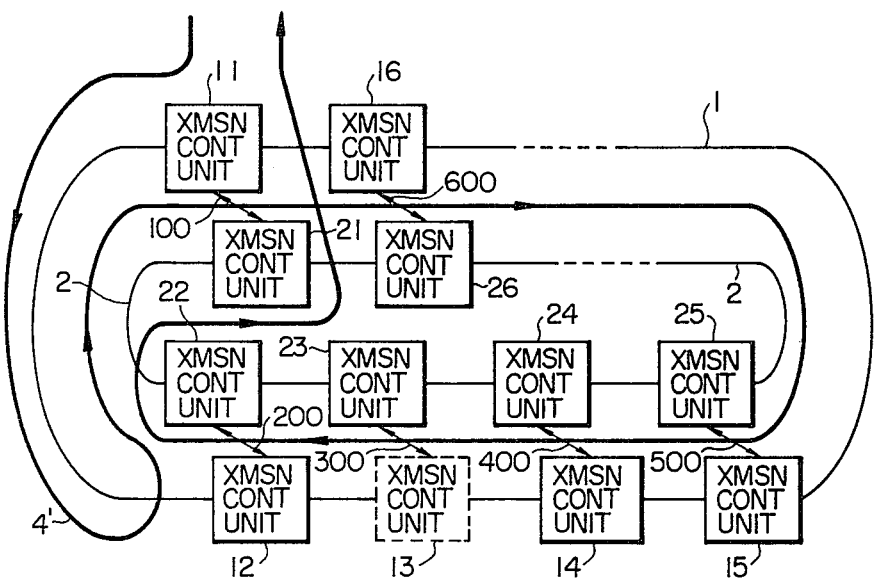
FIG. 8 is a view for explaining the bypass route forming process upon the occurrence of a second mode problem in the system of FIG. 1.

In FIG. 8, the unit 24 has its register 95 stored with "0" immediately after it has recovered from its problem. As a result, the unit 24 operates to feed a message which is assigned not to itself to the major loop 2 when it receives such a message.

The case will now be considered in which a message (CF=0) having the usual data is sent from the unit 11 to the terminal unit (although not shown) connected with the unit 15 in FIG. 8. The operations of the units 11, 12, 22, 21, 26 and 25 until that message from the unit 11 arrives at the units 12, 22, 21, 26 and 25 are the same as those in the case of FIG. 7. The unit 25 sends the message received to the terminal unit corresponding thereto and then further transfers that message. At this time, that message is different from that described in the case of FIG. 7 in that it is not transferred through the bypass route 500 to the major loop 2. Since the content of the register 95 in the unit 25 is "0", the unit 25 does not use the bypass route 500. As a result, when that message is to be transferred, the bypass code BC and the bypass number BN are not changed but are left at "0" and "1", respectively. The unit 24 transfers that message to the major loop 2 when it receives the same. This message passes similarly through the units 23 and 22 until it reaches the unit 21. The unit 21 feeds out that message to the bypass route 100 (at the operating mode (3)) and changes the bypass code BC from "0" to "1". Unit 21 also changes the bypass number BN from "1" to "2" on the conditions that the in-loop number $SA_2$ in the sending address SA of the message received is equal to its own address, that the loop number is different, and that BC=0 holds. Upon reception of this message, the unit 11 cancels the message if it is informed of the fact that the sending address is coincident with its own one. Thus, there is formed the composite transmission system which is indicated at a thick line 4' in FIG. 8.

In the transmission system shown in FIG. 8, moreover, the operations of the transmission system, when the unit 13 has a problem, are substantially the same as the aforementioned case. Specifically, as shown in FIG. 8, when the unit 11 detects a problem in the major loop 1, the minor loop check is performed in the same manner as that having been described with reference to FIG. 7. As a result, the unit 24 sets the register 95 at "1", when it detects a problem in the minor loop composed of the units 24, 23, 13 and 14, and then transfers the message having the usual data, when it receives the same from the major loop 2, to the bypass route 400. As a result, there is formed a composite transmission system which joins the units 11, 12, 22, 21, 26, 25, 24, 14, 15, 16 and 11 in this recited order. After that, the unit 24 having stored the register 95 with "1" feeds out the major loop check command to the major loop 2. Unit 24 then sets the register 95 at "0", if it is informed of the fact that the major loop 2 is normal, so that it will not use the bypass route 400 after that. As a result, the operations of the respective units at that time are the same as those having been described with FIG. 8.

Even if the unit 13 has a problem when the message is sent from the unit 11, for example, to the terminal unit connected with the unit 13 by the use of the composite transmission system shown in the solid line in FIG. 8, it should be noted that the unit 23 (which is coupled to the same terminal unit as unit 13 is) replaces the unit 13 so that the message can be transmitted to that terminal unit.

The formation of the composite transmission system of FIG. 7 is possible even when the bypass code BC is used. On the other hand, the composite transmission system 4' of FIG. 8 cannot be formed without the use of the bypass code BC. As a result, a variety of problem situations can be coped with by using the bypass code, and it does not deleteriously effect other operations where it is not needed.

Figure 9:
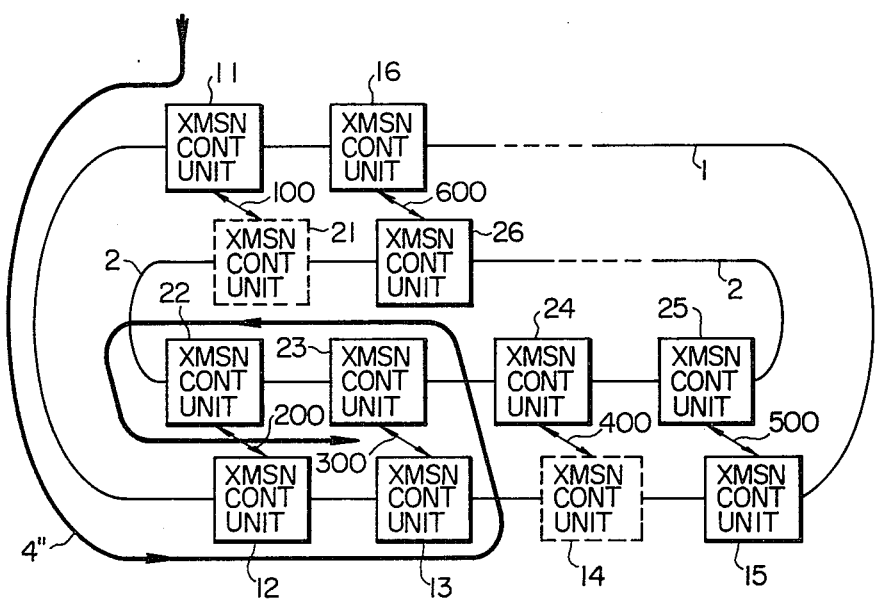
FIG. 9 is a view for explaining the bypass route forming process upon the occurrence of a third mode problem in the system of FIG. 1.

The method by which the bypass number BN is used for controlling the transmission of a message will be described with reference to FIG. 9. First, let it be assumed that the units 14 and 21 both have problems. In this case, the transmission systems of the major loops 1 and 2 both become incapable of transmission. If this is detected by the units 12 and 22, for example, they respectively feed out the message containing the minor loop check command to thereby start the minor loop check. In response to the minor loop check command from that unit 11, the other transmission control units 12 and 13 perform the minor loop check. Since the unit 21 has the problem, the unit 22 operates to transfer to the bypass route 200 the message which has been received from the major loop 2. Since the unit 14 also has a problem, the unit 13 also operates to transfer to the bypass route 300 the message which has been received from the major loop 1. As a result, one closed transmission route is formed of the units 12, 13, 23 and 22. For example, if under this condition, the unit 11 transmits the message containing the usual data, this message is repeatedly transferred in the order of the units 12, 13, 23 and 22 recited. This raises a concern that the message perpetually fails to disappear. According to the present invention, however, since the bypass number BN in the message is counted one by one when that message is transferred from the unit 13 to the unit 23 and from the unit 22 to the unit 12, the respective units 12, 13, 23 and 22, which have received that message, can erase this message if the bypass number BN exceeds a predetermined value, e.g., 3. As a result, it is possible to prevent the message from being perpetually transmitted through the minor loops.

As has been described hereinbefore, if the transmission routes of the major loops 1 and 2 are abnormal, the respective transmission units belonging to the major loop 1 or 2 will transmit a message which contains the check command as to whether or not the transmission of the minor loops can be made. On the other hand, the respective transmission control units of the major loops 1 and 2 transfer the message containing the transmission properness check command, in case they receive that message, and transmit the transmission properness check command by themselves thereby to check whether the minor loops starting therefrom are proper for the transmission or not. Moreover, the transmission control units, having detected the abnormal state and constructed the bypass route, transmit the major loop trouble restoration check command thereby to check for the restorations of the loops from their problems, thus finishing the construction of the bypass routes. By checking the transmission properness of a portion of the major loops 1 and 2 with the use of the respective transmission control units in the manner thus far described, it is possible to form the bypass route and to bring about the restoration therefrom without any use of a master station even if the major loops 1 and 2 are partially troubled. Further, by controlling the use of the bypass route with the use of the bypass code BC, the problems in the major loops 1 and 2 can be effectively coped with. Still further, by the use of the bypass number BN, the transmission of an unnecessary message can be ended.

It is to be understood that the above-described arrangements are simply illustrative of the application of the principles of this invention. Numerous other arrangements may be readily devised by those skilled in the art which embody the principles of the invention and fall within its spirit and scope.

We claim:
1. A loop transmission system comprising:
first and second loop-shaped transmission routes enabled to transmit a message in first and second directions, respectively;
a plurality of terminal units for communications through said first and second transmission routes;

a plurality of first transmission control units connected between said first transmission route and corresponding terminal units, respectively, for controlling the transmissions of the message on said first transmission route;

a plurality of second transmission control units connected between said second transmission route and corresponding terminal units, wherein each of said second transmission control units is coupled to mate with a corresponding one of said first transmission control units and is connected with the same corresponding terminal unit to which said corresponding first transmission control unit is connected, said second transmission control units controlling the transmission of the message on said second transmission route; and a plurality of bypass routes enabled to transmit the message in two ways and respectively connecting said first and second transmission control units mating with each other, said message containing, in addition to data to be transferred, a sending address, which is equal to the address of the transmission control unit having transmitted said message, and a bypass code capable of taking a first or second value, each of said first and second transmission control units including: means for sending the message to said bypass routes; means for receiving the message from said bypass routes; and means for storing and determining whether a minor loop is operating abnormally, said minor loop being comprised of said transmission control unit itself, a corresponding transmission control unit mated to said transmission control unit itself and located on a different transmission route, a bypass route for connecting said transmission control unit itself and the corresponding transmission control unit on a different path, a transmission control unit adjacent to said transmission control unit itself along the same transmission path, a transmission control unit corresponding to said adjacent transmission control unit and lying in the different transmission route, and a bypass route for connecting adjacent transmission unit and its corresponding transmission control unit; and means for controlling the sending process of the message received at each of said first and second transmission control units so that, when said storing means indicates that said minor loop is abnormal in a case where said message is received from the corresponding loop-shaped transmission route to which said transmission control unit itself is coupled, said message having its bypass code corrected is fed out of said control unit such that said message having its bypass code corrected to the first value is fed out to the corresponding loop-shaped transmission route if the sending address of the message received is equal to the address of its mating transmission control unit and if said bypass code takes said second value, and such that said message is fed out to the corresponding bypass route if the sending address of the message received is equal to the address of its mating transmission control unit and if said bypass code takes said first value.

2. A loop transmission system as set forth in claim 1, wherein said control means includes: first, second and third buffer means for storing the messages which are received, respectively, from the corresponding loop-shaped transmission route, bypass route and terminal unit; and means for sending the messages in said first, second and third buffer means after having stored the message, which has been fed from any of said corresponding loop-shaped transmission route, bypass route and terminal unit, in the corresponding one of said first, second and third buffer means when said message is received.

3. A loop transmission system as set forth in claim 1, wherein said control means is made operative:

(1) to send a minor loop check message, while acting as a transmitter by itself, to said loop-shaped transmission route and said bypass route when a major loop composed of the corresponding loop-shaped transmission route and said transmission control unit connected therewith is detected to be abnormal;

(2) partly to transfer a minor loop check message, which is sent from another transmission control unit, to said bypass routes and said corresponding transmission route when said message is received from said corresponding loop-shaped transmission route and said bypass route and partly to send said message to said corresponding transmission route while acting as a transmitter by itself; and (3) to detect whether or not said minor loop is abnormal in dependence upon whether said minor loop check message which has been sent, while acting as the transmitter by itself, is received or not after it has circulated once through said minor loop thereby to store said detected result in said storing means.

4. A loop transmission system as set forth in claim 3, wherein said control means is made operative to check whether or not said minor loop is abnormal in dependence upon whether or not said minor loop check message, which was sent by said control means while acting as the transmitter by itself, has circulated once through said minor loop and is received after it has been sent and before a predetermined time period has elapsed.

5. A loop transmission system as set forth in claim 3 or 4, wherein said control means is made operative to detect whether or not said loop is abnormal in dependence upon whether or not said sent message has circulated once through said loop-shaped transmission route and is received after said message has been sent to said loop-shaped transmission route and before a predetermined time period has elapsed.

6. A loop transmission system as set forth in claim 3, wherein said control means is made operative to feed out the message received to the corresponding terminal unit when the receiving address contained in said message is equal to the address of the transmission control unit mating therewith and when said bypass code takes said first value.

7. A loop transmission system as set forth in claim 3, wherein said control means is made operative:

(1) to send the message to which the bypass number data are added;

(2) to send the message received, which has been corrected to have its bypass number added to by one if the bypass number in the message fails to exceed a predetermined number, in case said message is to be fed out to the corresponding bypass route; and (3) to interrupt the sending process of the message received when the bypass number of said message exceeds said predetermined value.

8. A loop transmission system comprising:

first and second loop-shaped transmission routes for providing first and second major loop routes to transmit a message in first and second directions, respectively;

a plurality of terminal units for communications through said first and second transmission routes;

a plurality of first transmission control units connected between said first transmission route and corresponding terminal units, respectively, for controlling the transmission of the message on said first transmission route;

a plurality of second transmission control units connected between said second transmission route and corresponding terminal units, wherein each of said second transmission control units is coupled to mate with a corresponding one of said first transmission control units and is connected with the same corresponding terminal unit to which said corresponding first transmission control unit is connected, said second transmission control units controlling the transmissions of the message on said second transmission route;

a plurality of bypass routes enabled to transmit the message in two ways and respectively connecting said first and second transmission control units mating with each other means in each of said transmission control units for determining whether an abnormality exists in another transmission control unit located along the same major loop route; and means in each of said transmission control units for controlling the path of a message between two terminal units in accordance with a sending address SA in said message indicating an address of a transmission control unit which first sent the message and a bypass code BC in said message for establishing a composite route using both the first and second transmission loops and one or more bypass routes to bypass a transmission control unit which is abnormal, wherein said bypass code is determined by each transmission control unit along said composite path in accordance with whether said message is passed along a bypass route or a major route.

9. A loop transmission system as set forth in claim 8, further comprising means in each transmission control unit for determining in the event that an abnormality is detected along the major loop route to which the transmission control unit itself is coupled whether an abnormality exists along a minor loop path comprised of transmission control units adjacent to said transmission control unit itself along both the first and second transmission routes and the bypass routes connecting the respective transmission control units of the minor loop path.

10. A loop transmission system as set forth in claim 9, further comprising means for prohibiting the transfer of a message between two transmission control units if a bypass number BN provided in said message indicates that the number of times said message has used a bypass route in following said composite route between two terminal units exceeds a predetermined number.

11. A loop transmission system as set forth in claim 8, 9 or 10, further comprising means in each transmission control unit for periodically rechecking a major loop route originally determined to contain an abnormality to determine if the abnormality still exists.

12. A loop transmission system as set forth in claim 10, wherein the means for determining whether the minor loop contains an abnormality comprises means in each transmission control unit along the minor path for forwarding a minor loop check message along said minor loop, wherein BC and BN in said minor loop check message remain unchanged regardless of the use of bypass routes during the passage of said minor loop check message.

* * * * *